United States Patent [19]

Nagata et al.

[11] Patent Number: 4,580,609

[45] Date of Patent: Apr. 8, 1986

[54] ALL-SEASON TIRE

[75] Inventors: Takayoshi Nagata, Hyogo; Mitsuaki Hashiyama, Shiga, both of Japan

[73] Assignee: Toyo Tire and Rubber Company Limited, Osaka, Japan

[21] Appl. No.: 640,781

[22] Filed: Aug. 14, 1984

[30] Foreign Application Priority Data

Sep. 13, 1983 [JP] Japan .................................. 58-170334

[51] Int. Cl.⁴ .............................................. B60C 11/12
[52] U.S. Cl. ........................... 152/209 R; 152/DIG. 3
[58] Field of Search ........... 152/209 R, 209 A, 209 B, 152/209 NT, 209 WT, 209 D, 330 R, 374, DIG. 3

[56] References Cited

U.S. PATENT DOCUMENTS

| | | | |
|---|---|---|---|
| 3,707,177 | 12/1972 | Boileau | 152/209 R |
| 4,296,789 | 10/1981 | Roberts et al. | 152/209 R |
| 4,299,264 | 11/1981 | Williams | 152/209 R |
| 4,351,381 | 9/1982 | Roberts et al. | 152/209 R |
| 4,519,431 | 5/1985 | Yoshimura et al. | 152/209 R |

FOREIGN PATENT DOCUMENTS 0054911  6/1982  European Pat. Off. .

Primary Examiner—Lois E. Boland
Attorney, Agent, or Firm—Murray and Whisenhunt

[57] ABSTRACT

A tire having a tread, wherein a polymer component in the rubber composition constituting the tread comprises at least 30% by weight of a specific styrene-butadiene rubber produced by solution polymerization (S-SBR), and wherein the pattern of the tread has a specific contact area ratio, lateral groove density and lateral siping density is suitable for an all-season tire having high-wet grip properties, low rolling resistance, excellent low-temperature characteristics, and excellent on-ice and on-snow performance at a highly balanced level and with no sacrifice whatsoever of abrasion resisting characteristics.

4 Claims, No Drawings

ALL-SEASON TIRE

The present invention relates to an all-season tire having high-wet grip properties, low rolling resistance, excellent low-temperature characteristics, and excellent on-ice and on-snow performance at a highly balanced level and with no sacrifice whatsoever of abrasion resisting characteristics.

Auto tires are individually required to have various different constructions and compositions having such characteristics as will meet various different weather conditions, such as, for example, intensely sunny conditions under which the road surface is dry, rainy conditions under which the road surface is wet, and snowy conditions under which the road surface is covered with snow.

Hitherto, it has been a general practice to use, according to different weather conditions and purposes, various auto tires which are entirely different in composition and construction, such as general-purpose tires, high wet-grip tires, and snow tires.

However, changing tires according to the change in weather and climate conditions involves considerable loss in respect of cost. It is necessary to have different sets of tires at hand, and tire changing requires much labor and cost.

For this reason, demand has been increasing for an all-season tire, that is, a tire available under any weather condition and which exhibits good performance under any service conditions regardless of weather and climate.

Generally, it is a predominant practice to use as tread rubber for winter-service tires a polymer blend of natural rubber (NR) and butadiene rubber (BR), with carbon black and oil loaded in relatively large proportions. Such tread rubber has good suitability for service at low temperatures because the glass transition temperature (Tg) thereof is low, but it has a disadvantage that its grip capability on a wet road, or coefficient of friction on such road (Wet$\mu$), is low because of the presence of BR as a blend component. Another disadvantage is that a relatively large fill of carbon entails greater rolling resistance (RR) which brings energy loss. In other words, such tread rubber is disadvantageous for service under wet conditions and under general conditions, while it has good performance characteristics for winter service.

Tread rubber for summer-service tires is predominantly composed of a styrene-butadiene rubber produced by emulsion polymerization (E-SBR) as a main component. Tread rubber of such type exhibits fairly good characteristics under wet conditions, but it produces considerable energy loss due to RR and is inferior in low-temperature characteristics.

Attempts have been made to provide a tread rubber composition which is less liable to energy loss and which has excellent Wet$\mu$. For example, there is known a blend of NR with high-vinyl styrene-butadiene rubber (SBR) in which the butadiene (BD) part has a large 1,2-vinyl structure (particularly, more than 50 mole% of 1,2-vinyl structure). Also known is a blend of NR with high-vinyl BR having a large 1,2-vinyl structure. Such blends have high Wet$\mu$, but have a drawback in that their hardness at low temperatures is excessively high, that is, they are likely to become excessively stiffened so that their low-temperature characteristics are very unfavorable.

An object of the present invention is to provide an all-season tire having high wet-grip properties, low rolling resistance, excellent low-temperature characteristics, and excellent on-ice and on-snow performance, at a highly balanced level and with no sacrifice whatsoever of abrasion resisting characteristics.

The invention provides a tire having a tread, wherein a polymer component in the rubber composition constituting the tread comprises at least 30% by weight of a styrene-butadiene rubber produced by solution polymerization (S-SBR), the S-SBR comprising 10 to 20% by weight of styrene units and the balance of butadiene units; a content of butadiene units having 1,2-vinyl structure of 35 to 50 mole%; a ratios $\overline{Mw}/\overline{Mn}$ as an indication of molecular weight distribution of 1.2 to 3.5; and a content of isolated styrene units of 40% by weight or more and a content of styrene units in the form of long chain blocks each consisting of 8 or more styrene units bound to each other, of 5% by weight or less, both contents being determined by decomposing the S-SBR with ozone and by applying a gel permeation chromatographic analysis to the ozone decomposition product, and wherein the pattern of the tread is such that the contact area ratio as defined by equation 1 is 60 to 67%, the lateral groove density as defined by equation 2 is within the range of 0.041 to 0.056 mm/mm$^2$, and the lateral siping density as defined by equation 3 is within the range of 0.054 to 0.073 mm/mm$^2$:

$$\text{contact area ratio (\%)} = \frac{\text{available area of contact with road surface}}{\text{total projected area of tread}} \times 100 \quad \text{Eq. 1}$$

$$\text{lateral groove density (mm/mm}^2\text{)} = \frac{\text{total projected length of lateral groove components}}{\text{total projected area of tread}} \quad \text{Eq. 2}$$

$$\text{lateral siping density (mm/mm}^2\text{)} = \frac{\text{total projected length of lateral siping components}}{\text{total projected area of tread}} \quad \text{Eq. 3}$$

In the equations, each of contact area, length of lateral groove or siping component and tread area is measured on the basis of a development elevation view of tread pattern.

According to the invention, it is possible to obtain an all-season tire of the invention by using a solution-polymerized styrene-butadiene rubber (S-SBR) having the above specified microstructure and by selecting a tread pattern having a proper contact area ratio, a proper lateral groove density, and a proper lateral siping density.

The S-SBR used for the purpose of the invention is a random copolymer and comprises 10 to 20% by weight of styrene units and has a content of butadiene units having 1,2-vinyl structure of 35 to 50 mole%. It may be used alone, or may be used in blend with NR. In the latter case, it is preferable to blend so that the blend consists of 30% by weight or more of S-SBR and 70% by weight or less of NR. Where the styrene content of S-SBR is within the above specified range, high tensile strength, low rolling resistance, and high abrasion resistance can be assured. Where the 1,2-vinyl structure is within the above specified range, high abrasion resistance, low rolling resistance, and favorable coefficient of sliding friction can be obtained in good balance.

Said S-SBR must be such that $\overline{Mw}/\overline{Mn}$ as an indication of its molecular weight distribution, that is, the ratio between weight average molecular weight and number average molecular weight, is 1.2 to 3.5. If $\overline{Mw}/\overline{Mn}$ is smaller than 1.2, no satisfactory processability is obtainable, and if it is larger than 3.5, low rolling-resistance is not obtainable to any satisfactory extent. Referring to the styrene unit distribution as analyzed by gel permeation chromatography (GPC), it is required that a content of isolated styrene units, namely 1-chain styrene units is 40% by weight or more of the entire bound styrene, and a content of styrene units in the form of long chain blocks each consisting of 8 or more styrene units bound to each other, of 5% by weight or less of the entire bound styrene. In any case, deviation from the above limits are undesirable because such advantageous characteristics of S-SBR according to the invention as low rolling resistance and good abrasion resistance cannot be obtained.

The S-SBR in the invention preferably has a molecular weight distribution of a two or more peak (multimodal) pattern as formed in the process of polymerization by using a coupling agent such as tin tetrachloride. Such S-SBR exhibits excellent low rolling resistance compared with those having a molecular weight distribution of one-peak (monomodal) pattern, hence preferable.

The advantageous features of the S-SBR according to the invention are not limited to well-balanced porperties such as RR, Wet$\mu$, and abrasion resistance. The S-SBR exhibits excellent performance under low temperature conditions. It is less liable to stiffening at low temperatures. It shows a high coefficient of friction on ice (Ice$\mu$).

In the present invention, attention is paid not only to rubber composition for the tread, but also to the tread pattern. It has been found that a tread pattern of an all-season tire should preferably be such that the contact area ratio as defined by the aforesaid equation 1 is 60 to 67%, the lateral groove density as defined by equation 2 is within the range 0.041 to 0.056 mm/mm$^2$, and the lateral siping density as defined by equation 3 is within the range of 0.054 to 0.073 mm/mm$^2$.

With the contact area ratio of 68 to 80% as in the case with ordinary tires for typical summer service, no sufficient grip on ice or snow surfaces in winter can be obtained. Whilst, if the tread has a contact area ratio of 50 to 59% as in the case of conventional snow tires, any sufficient traction cannot be obtained under ordinary summer conditions. For tread pattern groove, if the lateral groove density is greater than that specified herein, their edge effect will become greater, the result is increased edge effect, which means excellent on-snow performance, but unfavorable abrasion resistance. Conversely, if the density is below the lower limit specified, there results considerable decrease in edge effect, which means unsatisfactory on-snow performance. Same thing can be said with lateral siping density. A density greater than specified means inferior abrasion resistance. If it is lower than specified, unfavorable on-snow performance.

In this invention no particular limitation is put on the construction of tire tread. The tread portion may be composed of one layer (unit compound tread type), or of two layers, that is, a base and a cap placed thereon (cap/base type). In the case of cap/base construction, needless to say, the present invention is applied to the cap portion.

The invention will be described in more detail with reference to the Examples, but they are not to be construed as limiting the scope of this invention.

Table 1 shows a formulation used in the evaluation of S-SBR shown in Table 2.

It is noted that abrasion resistance, RR, Wet$\mu$, and Ice$\mu$ as shown in Tables 2, 3 and 4 are given in terms of index numbers, with the following recipe taken as basis = 100 (recipe wherein 100 parts by weight of SBR 1502 were used in place of S-SBR in Table 1).

TABLE 1

| | |
|---|---|
| S-SBR | 100 part by weight |
| ISAF grade carbon black | 50 |
| Aromatic process oil | 10 |
| Stearic acid | 2 |
| Zinc oxide | 5 |
| Antioxidant | 1.5 |
| N—t-Butyl-2-benzothiazolyl-sulfenamide | 1 |
| Sulfur | 1.6 |

TABLE 2

| | Example | | | | | | | | |
|---|---|---|---|---|---|---|---|---|---|
| | 1 | 2 | 3 | 4 | 5 | 6 | 7 | 8 | 9 |
| Amount of bound styrene (wt %) | 11.5 | 15 | 10 | 18 | 18 | 15 | 15 | 20 | 12 |
| 1,2-Vinyl structure in BD (mole %) | 45 | 43 | 37 | 44 | 45 | 45 | 50 | 37 | 48 |
| Cis-1,4 structure in BD (mole %) | 18 | 19 | 23 | 19 | 18 | 18 | 17 | 23 | 17 |
| Trans-1,4 structure in BD (mole %) | 37 | 38 | 40 | 37 | 37 | 37 | 33 | 40 | 35 |
| (Mw/Mn) | 1.3 | 2.3 | 3.0 | 1.5 | 3.2 | 1.8 | 2.0 | 2.8 | 3.4 |
| Content of styrene unit | | | | | | | | | |
| S1 (wt %) | 42 | 51 | 43 | 48 | 42 | 52 | 45 | 42 | 48 |
| S8 (wt %) | 0.4 | 2.7 | 2.5 | 1.8 | 2.6 | 4.0 | 4.3 | 2.8 | 4.7 |
| Tg (°C.) | −59 | −56 | −69 | −52 | −51 | −54 | −50 | −57 | −55 |
| Roll processability (1) | G | E | E | G | E | E | E | E | G |
| Surface condition of extruded tread (2) | 4 | 5 | 5 | 4 | 5 | 5 | 5 | 5 | 4 |
| Edge condition of extruded tread (2) | 4 | 5 | 4 | 4 | 5 | 4 | 5 | 5 | 4 |
| Property of vulcanized rubber (3) | | | | | | | | | |
| Tensile strength (4) | 220 | 230 | 209 | 256 | 224 | 238 | 241 | 262 | 218 |
| Abrasion resistance (5) | 109 | 102 | 111 | 100 | 99 | 102 | 100 | 98 | 98 |
| Tire property | | | | | | | | | |
| RR (6) | 78 | 83 | 75 | 86 | 86 | 84 | 84 | 86 | 80 |
| Wet $\mu$ (7) | 102 | 104 | 100 | 112 | 110 | 105 | 106 | 108 | 105 |

TABLE 2-continued

|  | Comparison Example | | | | | | | | | |
|---|---|---|---|---|---|---|---|---|---|---|
|  | 1 | 2 | 3 | 4 | 5 | 6 | 7 | 8 | 9 | 10 |
| Amount of bound styrene (wt %) | 18 | 18 | 14 | 17 | 12 | 19 | 23 | 8.5 | 12 | 16 |
| 1,2-Vinyl structure in BD (mole %) | 45 | 45 | 47 | 48 | 45 | 40 | 45 | 40 | 30 | 60 |
| Cis-1,4 structure in BD (mole %) | 12 | 18 | 17 | 17 | 17 | 18 | 18 | 20 | 24 | 13 |
| Trans-1,4 structure in BD (mole %) | 43 | 37 | 36 | 35 | 38 | 42 | 37 | 40 | 46 | 27 |
| (Mw/Mn) | 1.17 | 4.1 | 1.4 | 3.2 | 2.8 | 3.0 | 1.9 | 2.0 | 2.5 | 3.1 |
| Content of styrene unit |  |  |  |  |  |  |  |  |  |  |
| S1 (wt %) | 41 | 43 | 35 | 28 | 41 | 42 | 42 | 43 | 45 | 41 |
| S8 (wt %) | 3.0 | 2.8 | 4.9 | 4.5 | 5.8 | 7.5 | 4.3 | 3.0 | 2.8 | 2.7 |
| Tg (°C.) | −51 | −51 | −53 | −48 | −58 | −54 | −43 | −67 | −74 | −38 |
| Roll processability (1) | F | E | G | G | E | G | G | E | E | G |
| Surface condition of extruded tread (2) | 3 | 5 | 4 | 4 | 5 | 4 | 4 | 5 | 5 | 5 |
| Edge condition of extruded tread (2) | 2 | 5 | 4 | 4 | 5 | 4 | 4 | 5 | 5 | 4 |
| Property of vulcanized rubber (3) |  |  |  |  |  |  |  |  |  |  |
| Tensile strength (4) | 235 | 210 | 229 | 240 | 231 | 238 | 252 | 212 | 198 | 240 |
| Abrasion resistance (5) | 99 | 86 | 90 | 88 | 87 | 83 | 94 | 111 | 113 | 93 |
| Tire property |  |  |  |  |  |  |  |  |  |  |
| RR (6) | 84 | 90 | 92 | 95 | 91 | 94 | 105 | 78 | 77 | 108 |
| Wet μ (7) | 111 | 109 | 106 | 112 | 103 | 107 | 120 | 93 | 94 | 118 |

Notes to Table 2:
(1) Roll wrapping properties, controllability, etc. were evaluated using 12 inch rolls. General evaluation is shown. "E" means excellent, "G" good and "F" fair.
(2) Shown in 5-point system (point 5 max).
(3) Heated and press cured at 160° C. for 20 min.
(4) Measured according to JIS K-6310 (kg/cm$^2$).
(5) Evaluated according to ASTM D2228 and by using Pico abrasion tester. Values shown in index numbers, with SBR 1502, an E-SBR, taken as 100. The greater the value, the better.
(6) Tires of 185/70HR14 were made; recipes shown were used for treads. Their performance characteristics were measured. Pattern used: contact area ratio 64%, lateral groove density 0.049 mm/mm$^2$, lateral siping density 0.064 mm/mm$^2$. Measurements were made according to Twinroll method, described in American Association of Automobile Engineers's journal SAE No. 770875. Tires each fitted on a 5-J×14 rim. Rolling resistance (RR) measured under conditions of air pressure, 1.8 kg/cm$^2$, and load, 336 kg. SBR 1502=100. The smaller the value, the better.
(7) With same tires as those used in the rolling resistance tests, Wet μ was measured according to the method specified under UTQGS, American tire quality grade standards. Tires, fitted on 5-J×14 rim, were mounted to a test trailer. Run onwet asphalt road surface under conditions of air pressure 1.8 kg/cm$^2$ and load 336 kg. Wet μ was measured when tire revolution was locked. Measurements shown in indices, with SBR 1502=100. Larger values are more favorable. Content of styrene units in polymer, and microstructure of butadiene were measured by Hampton method using infrared spectrum. [Reference: Anal. Chem. 21, 923 (1949)] In the Table 2, S1 means a content of isolated styrene units and S8 means a content of styrene units in the form of long chain blocks each consisting of 8 or more styrene units.

As Table 2 shows, Comparison Example 1, where a polymer having a molecular weight distribution of 1.17 was used, had poor roll-workability, with unfavorable surface and edge conditions of extruded tread. In the case of Comparison Example 2 in which a polymer having a molecular weight distribution of 4.1 is used, abrasion resistance was unsatisfactory and rolling resistance was considerable. Table 2 proves that molecular weight distribution should be preferably 1.2 to 3.5.

It was found that there must be a content of bound styrene of 10 to 20% by weight, with a content of butadiene (BD) units having 1,2-vinyl structure of 35 to 50 mole%. If, as in Comparison Example 7, the bound styrene content accounts for as much as 23% by weight, or if, as in Comparison Example 10, the content of 1,2-vinyl structure amounts to as much as 60 mole%, the tire is subject to considerable rolling resistance, and accordingly to greater energy loss. If the bound styrene content is no more than 8.5% by weight as in Comparison Example 8, or if the content of 1,2-vinyl structure is no more than 30 mole% as in Comparison Example 9, the on-wet-surface skid resistance Wetμ is insufficient.

Referring next to chain length of styrene units, Comparison Examples 3 and 4 in which isolated (1-chain) styrene units constitute less than 40% by weight of the entire bound styrene content are cases in which the rolling resistance (energy loss) of the tire is considerable and the abrasion resistance is unfavorable. Same thing can be said with Comparison Examples 5 and 6 in which 8-or-more chain styrene units account for more than 5% by weight of the entire bound styrene. Therefore, it is clear that 1-chain styrene units should constitute 40% by weight or more of the entire bound styrene, and 8-or-more chain styrene units should constitute less than 5% by weight of the entire bound styrene. Further, as is apparent from Table 2, it is desirable to use a polymer having a glass transition temperature of −50° C. or below (Tg, measured by Model DSC-2, Perkin Elmer). A polymer having a Tg higher than −50° C. brings greater rolling resistance of the tire.

Table 3 shows characteristics of S-SBR/natural rubber blends, with comparison examples for reference.

In the recipes shown are used 100 parts by weight of a mixture of S-SBR and NR in place of 100 parts by weight of S-SBR in Table 1.

TABLE 3

|  | Example | | | | Com. Example | | | | | | |
|---|---|---|---|---|---|---|---|---|---|---|---|
|  | 10 | 11 | 12 | 13 | 11 | 12 | 13 | 14 | 15 | 16 | 17 |
| S-SBR (wt parts) | 70 | 50 | 60 | 40 | 70 | 60 | 70 | 50 | 70 | 50 | 20 |
| Amount of bound styrene (wt %) | 15 | 15 | 18 | 19 | 13 | 18 | 25 | 7 | 18 | 16 | 19 |
| 1,2-Vinyl structure in BD | 47 | 47 | 37 | 35 | 28 | 57 | 46 | 38 | 48 | 38 | 35 |

TABLE 3-continued

|  | Example | | | | Com. Example | | | | | | |
| --- | --- | --- | --- | --- | --- | --- | --- | --- | --- | --- | --- |
|  | 10 | 11 | 12 | 13 | 11 | 12 | 13 | 14 | 15 | 16 | 17 |
| (mole %) |  |  |  |  |  |  |  |  |  |  |  |
| Cis-1,4 structure in BD | 17 | 18 | 23 | 24 | 25 | 13 | 18 | 22 | 17 | 23 | 21 |
| (mole %) |  |  |  |  |  |  |  |  |  |  |  |
| Trans-1,4 structure in BD | 36 | 35 | 40 | 41 | 47 | 30 | 36 | 40 | 35 | 39 | 44 |
| (mole %) |  |  |  |  |  |  |  |  |  |  |  |
| (Mw/Mn) | 1.5 | 2.3 | 1.8 | 3.2 | 1.6 | 3.0 | 2.8 | 2.5 | 1.5 | 1.8 | 3.2 |
| Content of styrene unit |  |  |  |  |  |  |  |  |  |  |  |
| S1 (wt %) | 52 | 52 | 45 | 43 | 50 | 45 | 53 | 48 | 26 | 49 | 43 |
| S8 (wt %) | 1.8 | 1.8 | 2.5 | 3.4 | 0.9 | 0.8 | 2.0 | 3.1 | 4.0 | 6.5 | 3.4 |
| Tg (°C.) | −52 | −52 | −57 | −57 | −73 | −36 | −39 | −71 | −48 | −58 | −57 |
| NR (wt parts) | 30 | 50 | 40 | 60 | 30 | 40 | 30 | 50 | 30 | 50 | 80 |
| Property of vulcanized rubber |  |  |  |  |  |  |  |  |  |  |  |
| Tensile strength | 260 | 293 | 258 | 298 | 220 | 256 | 281 | 229 | 253 | 231 | 299 |
| Abrasion resistance | 102 | 101 | 99 | 98 | 113 | 97 | 95 | 117 | 85 | 82 | 90 |
| Tire property |  |  |  |  |  |  |  |  |  |  |  |
| RR | 83 | 86 | 84 | 86 | 80 | 104 | 102 | 78 | 100 | 92 | 88 |
| Wet μ | 104 | 113 | 107 | 109 | 92 | 117 | 115 | 93 | 110 | 106 | 98 |

As described above, the tire tread of the invention exhibits excellent performance in all characteristics such as energy loss due to rolling resistance of the tire, friction force on wet road surface, abrasion resistance, and workability in production process. This is attributable to the fact that the S-SBR has a content of styrene units of 10 to 20% by weight and a content of butadiene units having 1,2-vinyl structure of 35 to 50 mole%, that $\overline{Mw}/\overline{Mn}$ is 1.2 to 3.5, and that the S-SBR has a content of isolated styrene units of 40% by weight or more and a content of styrene units in the form of long chain blocks each consisting of 8 or more styrene units bound to each other, of 5% by weight or less, both contents being determined by decomposing the S-SBR with ozone and by applying a gel permeation chromatographic analysis to the ozone decomposition product. This rubber may be used alone, or may be used suitably in blend with natural rubber as shown in Table 3. It must be noted, however, as is apparent from a comparison of Example 13 and Comparison Example 17, 30% by weight or more of S-SBR is required where it is used in blend with NR.

The advantages of the S-SBR according to the invention are not limited to the above explained performance characteristics. The S-SBR has surprisingly good low-temperature characteristics.

Known blends of high-vinyl SBR or high-vinyl BR and NR intended to provide a tread composition liable to less energy loss and having excellent Wetμ, wherein the high-vinyl SBR has a larger content of butadiene units having 1,2-vinyl structure, that is, 50 mole% or more of such structure, or the high-vinyl BR has a larger 1,2-vinyl content, have a favorable balance of Wetμ and rolling resistance, but are liable to become stiffened at low temperatures; therefore, their low-temperature characteristics are rather poor.

Special winter-service compositions using a blend of NR, a polymer claimed to have good low-temperature characteristics, and a high-cis butadiene rubber (high-cis BR), with large amounts of carbon black and oils incorporated therein (generally, 70 parts by weight or more of carbon black and 30 parts by weight or more of oils), have good low-temperature characteristics, being less liable to become stiffened at low temperatures. However, their Wetμ is low because a high-cis BR is used, and further, they have considerable RR because their carbon content is large. They are advantageous as such for winter service, but their performance characteristics under wet conditions and general conditions are rather unfavorable.

In the field of all-season tire treads to which the present invention is directed, there have previously been used rubber blends containing emulsion-polymerized styrene-butadiene rubber (E-SBR) and BR. The tread-rubber composition of the all-season tire of the invention comprising rubber components including S-SBR or a mixture of S-SBR and NR have remarkable advantages over the conventional compositions in respect of various characteristics.

Table 4 below indicates that the tread rubber compositions of the all-season tire of the invention have an exceedingly favorable balance of performance characteristics under all conditions. The S-SBR used in Table 4 is shown in detail in Table 5.

TABLE 4

| Composition | Example | | | | | Com. Example | | | | | | |
| --- | --- | --- | --- | --- | --- | --- | --- | --- | --- | --- | --- | --- |
| (parts by weight) | 14 | 15 | 16 | 17 | 18 | 18 | 19 | 20 | 21 | 22 | 23 | 24 |
| S-SBR-1 | 100 | 50 |  |  |  |  |  |  |  |  |  |  |
| S-SBR-2 |  |  | 70 | 50 | 50 |  |  |  |  |  |  |  |
| S-SBR-3 |  |  |  |  |  |  |  | 100 |  |  |  |  |
| S-SBR-4 |  |  |  |  |  |  |  |  | 50 |  |  |  |
| SBR 1502 |  |  |  |  |  |  |  |  |  |  | 70 | 60 |
| NR |  | 50 | 30 | 50 | 50 | 70 | 60 |  | 50 | 50 | 30 | 40 |
| 98% Cis BR |  |  |  |  |  | 30 | 40 |  |  |  |  |  |
| 80% Vinyl BR |  |  |  |  |  |  |  |  |  | 50 |  |  |
| HAF grade Carbon black | 50 | 60 |  |  | 50 |  | 90 | 50 | 60 |  | 70 |  |
| ISAF grade Carbon black |  |  | 50 | 60 |  | 80 |  |  |  | 50 |  | 60 |
| Aromatic oil | 10 | 20 | 10 | 20 | 15 | 30 | 50 | 10 | 20 | 10 | 30 | 10 |
| Naphthenic oil |  |  |  |  |  | 30 |  |  |  |  |  | 10 |
| Zinc oxide | 3 | 3 | 3 | 3 | 3 | 3 | 3 | 3 | 3 | 3 | 2 | 2 |

TABLE 4-continued

| Composition | Example | | | | | Com. Example | | | | | | |
|---|---|---|---|---|---|---|---|---|---|---|---|---|
| (parts by weight) | 14 | 15 | 16 | 17 | 18 | 18 | 19 | 20 | 21 | 22 | 23 | 24 |
| Stearic acid | 3 | 2 | 3 | 2 | 2 | 3 | 3 | 3 | 3 | 3 | 2 | 2 |
| Wax | 2 | 2 | 2 | 2 | 2 | 0 | 0 | 2 | 2 | 2 | 1 | 1 |
| Antioxidant | 2 | 1.5 | 2 | 1.5 | 1.5 | 3 | 3 | 2 | 1.5 | 1.5 | 1.5 | 1.5 |
| Vulcanization accelerator D (1) | 0.2 | 0.2 | 0.2 | 0.2 | 0.2 | 0 | 0 | 0.2 | 0.2 | 0.2 | 0.2 | 0.2 |
| Vulcanization accelerator MSA (2) | 1.5 | 1.5 | 1.5 | 1.5 | 1.5 | 1.8 | 1.8 | 1.5 | 1.5 | 1.5 | 1.3 | 1.3 |
| Sulfur | 2 | 2 | 2 | 2 | 2 | 2 | 2 | 2 | 2 | 2 | 2.3 | 2.3 |
| Property of vulcanized rubber | | | | | | | | | | | | |
| Abrasion resistance | 100 | 101 | 103 | 105 | 98 | 62 | 85 | 93 | 92 | 83 | 90 | 101 |
| Hardness (0° C.) | 61 | 59 | 59 | 56 | 58 | 47 | 54 | 65 | 65 | 63 | 68 | 64 |
| (−20° C.) | 68 | 64 | 65 | 63 | 65 | 52 | 62 | 75 | 72 | 70 | 76 | 75 |
| Tire property | | | | | | | | | | | | |
| RR | 84 | 85 | 84 | 86 | 84 | 115 | 120 | 92 | 90 | 86 | 96 | 92 |
| Wet μ | 106 | 109 | 108 | 112 | 115 | 93 | 87 | 115 | 112 | 108 | 90 | 88 |
| Ice μ | 117 | 123 | 120 | 121 | 118 | 158 | 143 | 89 | 95 | 98 | 102 | 104 |
| Wet μ/RR | 1.28 | 1.28 | 1.29 | 1.30 | 1.37 | 0.81 | 0.73 | 1.25 | 1.24 | 1.26 | 0.94 | 0.96 |

(1) 1,3-Diphenyl guanidine
(2) N—Oxydiethylene-2-benzothiazylsulfenamide

TABLE 5

|  | S-SBR-1 | S-SBR-2 | S-SBR-3 | S-SBR-4 |
|---|---|---|---|---|
| Amount of bound styrene (wt %) | 15 | 18 | 22 | 15 |
| 1,2-Vinyl structure in BD (mole %) | 45 | 40 | 48 | 60 |
| Cis-1,4 structure in BD (mole %) | 18 | 21 | 17 | 13 |
| Trans-1,4 structure in BD (mole %) | 37 | 39 | 35 | 27 |
| (Mw/Mn) | 1.5 | 2.5 | 1.8 | 2.5 |
| Content of styrene unit | | | | |
| S1 (wt %) | 55 | 47 | 30 | 32 |
| S8 (wt%) | 1.3 | 0.9 | 1.8 | 5.2 |
| Tg (°C.) | −54 | −53 | −40 | −38 |

Notes to Table 4
Hardness ... measured according to JIS K-6301
Ice μ ... On-ice friction coefficients at −10° C., shown in indices. The recipe, in which 100 parts by weight of SBR 1502 were used in place of S-SBR in Table 1 is taken as base=100. Larger values are more favorable.

As Table 4 shows, Comparison Examples 18 and 19 which represent special recipes for winter-service indicate less stiffening characteristics at low temperatures and relatively high Iceμ values, but are at a rather low level in RR and Wetμ.

Comparison Examples 20, 21 and 22, which are aimed at energy saving and high Wetμ, all show low RR and yet favorable Wetμ; but their hardness at low temperatures is rather high and their Iceμ is extremely low. As such, they are not suitable for low-temperature service.

Where S-SBR is used, but the content of 1,2-vinyl structure of the butadiene part exceeds 50 mole%, any satisfactory composition cannot be obtained which has a desired level of RR and Iceμ characteristics, even if the styrene content is within the range of 10 to 20% by weight (S-SBR-4). This is also true with S-SBR-3 in which the styrene content exceeds 20% by weight. Thus, it is essential that the styrene content must be within the range of 10 to 20% by weight and the 1,2-vinyl content of the butadiene part must be 35 to 50 mole%.

E-SBR and BR blends (Comparison Examples 23 and 24) previously known as typical all-season tire tread compositions have a balance of RR, Wetμ and Iceμ characteristics in low levels. In all respects, however, the tread composition of the all-season tire of the present invention have very remarkable advantages over the above conventional compositions. It is to be noted that plasticizers such as DOA (dioctyl adipate) may be suitably used in addition to such agents as softening agent, aromatic oil and naphthenic oil shown in the table.

In Tables 6 to 8 are shown the effects of tire tread pattern, that is, contact area ratio, lateral groove density and lateral siping density, which represent the results of research efforts directed by the present invention. The term "contact area ratio" referred to herein the ratio of area of the portion in contact with the road surface to the total projected area of the tread, as determined on the basis of a development eleva-tion view of tread pattern. That is, it refers to an entire tread portion excluding groove, siping, and like recesses.

TABLE 6

|  | Com. Ex. | | Ex. | | Com. Ex. | |
|---|---|---|---|---|---|---|
|  | 25 | 26 | 19 | 20 | 27 | 28 |
| Contact area ratio | 50 | 55 | 62 | 65 | 72 | 80 |
| Tire characteristics | | | | | | |
| RR | 100 | 114 | 119 | 123 | 141 | 153 |
| Wet μ | 100 | 104 | 115 | 120 | 122 | 118 |
| Wet μ/RR | 1.00 | 0.91 | 0.97 | 0.98 | 0.87 | 0.77 |
| Ice μ | 100 | 105 | 112 | 114 | 114 | 117 |
| On-snow performance | 5.0 | 5.0 | 5.0 | 4.5 | 3.5 | 3.0 |

Note:
(1) Compositions of tire tread rubber in Tables 6 to 8 are shown below.
S-SBR-1 (see Table 5)  50 (parts by weight)
NR  50

TABLE 6-continued

|  | Com. Ex. | Ex. | Com. Ex. |
|---|---|---|---|
|  | 25  26 | 19  20 | 27  28 |
| Carbon black (ISAF grade) | 55 | | |
| Aromatic oil | 15 | | |
| Zinc oxide | 3 | | |
| Stearic acid | 3 | | |
| Wax | 2 | | |
| Antioxidant | 2 | | |
| Vulcanization accelerator CZ (1) | 1.5 | | |
| Sulfur | 2 | | |

The above (1) is N—cyclohexyl-2-benzothiazyl-sulfenamide.
(2) Tire size is 185/70HR14. Lateral groove density of pattern is 0.049 mm/mm$^2$, and lateral siping density is 0.064 mm/mm$^2$.
(3) In Table 6, RR, values for Wet $\mu$ and Ice $\mu$ are given in terms of indices as calculated on the basis of Comparison Example 25. The smaller the value of RR, the better, while the greater the value of Wet $\mu$ or Ice $\mu$, the better.
(4) On-snow performance is indicated by 5-point method (point 5 max) on the basis of on-snow steering stability measurements.

According to our researches, contact area ratio is generally 68 to 80% in the case of ordinary summer-service tires, and is 50 to 59% in the case of snow tires.

As Table 6 shows, the rolling resistance (as an indication of energy loss) of a tire becomes unfavorable as the contact area ratio becomes greater. This tendency is remarkable particularly in the case of Comparison Examples 27 and 28 (contact area ratios 72% and 80% respectively).

On-wet-surface friction coefficient Wet$\mu$ tends to improve as the contact area ratio increases, but tends to rather grow worse when the contact area ratio exceeds 67%.

On-ice friction coefficient Ice$\mu$ tends to show little or no improvement when the contact area ratio of about 60% is reached. Where contact area ratio is large (as in Comparison Examples 27, 28), no favorable on-snow performance is achievable, but as can be seen from Examples 19 and 20, satisfactory on-snow performance can be attained, if contact area ratio is 67% or below.

From the standpoint of balancing of above four characteristic elements, an all-season tire tread should preferably have a contact area ratio of 60 to 67%.

Table 7 shows the effects of lateral groove density. If lateral groove density is smaller than 0.041 mm/mm$^2$ as in Comparison Example 29, edge effect is small, and accordingly, on-snow performance of the tire is rather poor. If lateral groove density is larger than 0.056 mm/mm$^2$ as in Comparison Example 30, the tire can exhibit satisfactory on-snow performance, but its abrasion resistance is unfavourably low. As can be seen from Examples 21, 22 and 23, therefore, it is preferable that the lateral groove density of an all-season tire tread should be within the range of 0.041 to 0.056 mm/mm$^2$.

Table 8 shows the influence of lateral siping density. The effect of lateral siping density shows same tendency as seen with the effect of lateral groove density. If lateral siping density is smaller than 0.054 mm/mm$^2$ as in Comparison Example 31, edge effect is naturally small, and accordingly the on-snow performance of the tire is unfavorable. If lateral siping density is larger than 0.073 mm/mm$^2$ as in Comparison Example 32, the on-snow performance of the tire is excellent, but its abrasion resistance is extremely low. In order to obtain well-balanced tire characteristics, therefore, as can be clearly seen from Examples 24, 25 and 26, the lateral siping density should preferably be within the range of 0.054 to 0.073 mm/mm$^2$.

Table 9 shows examples of cases where the invention may be advantageously applied to the cap portion of a cap/base structure. Examples 27 and 28 in which the rubber composition of the invention is applied to the cap portion, are advantageously well balanced in respect of RR, Wet$\mu$, Ice$\mu$, on-snow performance and abrasion resistance, as compared with Comparison Example 33 in which a rubber composition other than the one of the invention is applied to the cap portion only, or Comparison Example 34 in which such rubber composition other than the invention is applied to both cap and base portions (unit compound tread type).

TABLE 7

|  | Com. Ex. | Example | | | Com. Ex. |
|---|---|---|---|---|---|
|  | 29 | 21 | 22 | 23 | 30 |
| Lateral groove density (mm/mm$^2$) | 0.035 | 0.043 | 0.048 | 0.053 | 0.062 |
| Tire characteristics | | | | | |
| RR | 100 | 101 | 100 | 99 | 101 |
| Wet $\mu$ | 100 | 101 | 101 | 100 | 100 |
| Ice $\mu$ | 100 | 100 | 99 | 102 | 101 |
| On-snow performance | 3.5 | 4.5 | 5.0 | 5.0 | 5.0 |
| Abrasion resistance | 100 | 98 | 97 | 95 | 82 |

Notes to Table 7:
(1) Tire size is 185/70HR14. Contact area ratio of pattern is 64%, and lateral siping density is 0.064 mm/mm$^2$.
(2) In Table 7, RR, values for Wet $\mu$ and Ice $\mu$ are given in terms of indices as calculated on the basis of Comparison Example 29. The smaller the value of RR, the better, while the greater the value of Wet $\mu$ or Ice $\mu$, the better.
(3) Abrasion resistance is evaluated by abrasion amounts after the tire ran 10,000 km and is given in terms of indices as calculated on the basis of Comparison Example 29. Larger values are more favorable.

TABLE 8

|  | Com. Ex. | Example | | | Com. Ex. |
|---|---|---|---|---|---|
|  | 31 | 24 | 25 | 26 | 32 |
| Lateral siping density (mm/mm$^2$) | 0.049 | 0.056 | 0.064 | 0.071 | 0.078 |
| Tire characteristics | | | | | |
| RR | 100 | 100 | 101 | 101 | 101 |
| Wet $\mu$ | 100 | 100 | 99 | 101 | 100 |
| Ice $\mu$ | 100 | 101 | 100 | 101 | 99 |
| On-snow performance | 3.5 | 5.0 | 5.0 | 5.0 | 5.0 |
| Abrasion resistance | 100 | 99 | 98 | 96 | 84 |

Notes to Table 8:
(1) Tire size is 185/70HR14. Contact area ratio of pattern is 64%, and lateral groove density is 0.049 mm/mm$^2$.
(2) In Table 8, RR, values for Wet $\mu$, Ice $\mu$ and abrasion resistance are given in terms of indices as calculated on the basis of Comparison Example 31.

TABLE 9

|  | Example | | Com. Ex. | |
|---|---|---|---|---|
|  | 27 | 28 | 33 | 34 |
| Cap portion | Rubber composition A | Rubber composition B | Rubber composition C | Rubber composition D |
| Base portion | Rubber composition E | Rubber composition E | Rubber composition E | Rubber composition D |
| Tire characteristics | | | | |
| RR | 81 | 82 | 85 | 100 |
| Wet $\mu$ | 116 | 120 | 118 | 100 |
| Ice $\mu$ | 114 | 116 | 97 | 100 |
| On-snow performance | 5.0 | 5.0 | 4.0 | 4.0 |

TABLE 9-continued

|  | Example | | Com. Ex. | |
| --- | --- | --- | --- | --- |
|  | 27 | 28 | 33 | 34 |
| Abrasion resistance | 109 | 112 | 93 | 100 |

Notes to Table 9:
(1) Tire size is 185/70HR14. Contact area ratio of pattern is 64%, lateral groove density is 0.049 mm/mm² and lateral siping density is 0.064 mm/mm².
(2) In Table 9, RR, values for Wet μ, Ice μ and abrasion resistance are given in terms indices as calculated on the basis of Comparison Example 34.
(3) Rubber compositions used in cap and base portions are as follows:

| Rubber composition A: | Example 14 in Table 4 |
| --- | --- |
| Rubber composition B: | Example 16 in Table 4 |
| Rubber composition C: | Com. Ex. 22 in Table 4 |
| Rubber composition D: | Com. Ex. 23 in Table 4 |

Rubber composition E:

| NR 80 (parts by weight), | | BR | 20 |
| --- | --- | --- | --- |
| Aromatic oil | 5, | Zinc oxide | 3 |
| Stearic acid | 2.5, | Antioxidant | 1.0 |
| GPF carbon | 35, | Sulfur | 2 |
| Vulcanization accelerator D | | 0.2 | |
| Vulcanization accelerator MSA | | 1.5 | |

We claim:

1. A tire having a tread, wherein a polymer component in the rubber composition constituting the tread comprises at least 30% by weight of a styrene-butadiene rubber produced by solution polymerization (S-SBR), the S-SBR comprising 10 to 20% by weight of styrene units and the balance of butadiene units; a content of butadiene units having 1,2-vinyl structure of 35 to 50 mole%; a ratio $\overline{Mw}/\overline{Mn}$ as an indication of molecular weight distribution of 1.2 to 3.5; and a content of isolated styrene units of 40% by weight or more and a content of styrene units in the form of long chain blocks each consisting of 8 or more styrene units bound to each other, of 5% by weight or less, both contents being determined by decomposing the S-SBR with ozone and by applying a gel permeation chromatographic analysis to the ozone decomposition product, and wherein the pattern of the tread is such that the contact area ratio as defined by equation 1 is 60 to 67%, the lateral groove density as defined by equation 2 is within the range of 0.041 to 0.056 mm/mm², and the lateral siping density as defined by equation 3 is within the range of 0.054 to 0.073 mm/mm²:

$$\text{contact area ratio (\%)} = \frac{\text{available area of contact with road surface}}{\text{total projected area of tread}} \times 100 \quad \text{Eq. 1}$$

$$\text{lateral groove density (mm/mm}^2\text{)} = \frac{\text{total projected length of lateral groove components}}{\text{total projected area of tread}} \quad \text{Eq. 2}$$

$$\text{lateral siping density (mm/mm}^2\text{)} = \frac{\text{total projected length of lateral siping components}}{\text{total projected area of tread}} \quad \text{Eq. 3}$$

2. A tire as defined in claim 1 wherein the S-SBR has a glass transition temperature of −50° C. or below, which is measured by Model DSC-2 of Perkin Elmer.

3. A tire as defined in claim 1 wherein the polymer component is a blend of 30% or more by weight of S-SBR and 70% or less by weight of natural rubber.

4. A tire as defined in claim 1 wherein the S-SBR has a molecular weight distribution of multimodal pattern.

* * * * *